United States Patent
Toyama

[11] Patent Number: 5,548,447
[45] Date of Patent: Aug. 20, 1996

[54] PHOTOGRAPHIC LENS SYSTEM

[75] Inventor: Nobuaki Toyama, Omiya, Japan

[73] Assignee: Fuji Photo Optical Co., Ltd., Saitama-ken, Japan

[21] Appl. No.: 411,877

[22] Filed: Mar. 28, 1995

[30] Foreign Application Priority Data

Mar. 29, 1994  [JP]  Japan ................................. 6-059060

[51] Int. Cl.$^6$ ..................................................... G02B 9/62
[52] U.S. Cl. .......................... 359/759; 359/757; 359/756
[58] Field of Search ...................................... 359/756, 757, 359/759, 755, 683

[56] References Cited

FOREIGN PATENT DOCUMENTS 58-4112   1/1983   Japan .
5-164961  6/1993   Japan .

*Primary Examiner*—Georgia Y. Epps
*Assistant Examiner*—Evelyn A. Lester
*Attorney, Agent, or Firm*—Young & Thompson

[57] ABSTRACT

A photographic lens system comprises, in order from the object end, a positive power element having a concave image end surface, an element having a concave image end surface, a negative power element, a positive power element, a meniscus element of a positive power having a concave object end surface, and a doublet comprising a negative power element having a concave object end surface and a positive power element having a convex image end surface, and satisfies the following conditions:

| | |
|---|---|
| $0.28 < f/f_4 < 2.55$ | (1) |
| $0 < f/f_5 < 1.80$ | (2) |
| $-1.15 < f/f_{67} < 0.65$ | (3) |
| $-0.55 < (R_6-R_7)/(R_6+R_7) < -0.17$ | (4) |
| $0.03 < (R_{10}-R_{11})/(R_{10}+R_{11}) < 0.31$ | (5) |
| $-0.45 < (R_{11}-R_{14})/(R_{11}+R_{14}) < 0.10$ | (6). |

8 Claims, 6 Drawing Sheets

FIG. 12A
SPHERICAL ABERRATION

FIG. 12B
ASTIGMATISM

FIG. 12C
DISTORTION

PHOTOGRAPHIC LENS SYSTEM

BACKGROUND OF THE INVENTION

1. Field of the invention

The resent invention relates to a photographic lens system, and, more particularly, to a wide angle lens system suitable for use with a lens shutter camera.

2. Description of Related Art

Much attention has been given to various optical approaches relating to miniaturization of still cameras equipped with wide angle lens systems. Various efforts have been made to provide wide angle lens systems having large F numbers and well corrected aberrations.

One such a wide angle lens system is that described in Japanese Unexamined Patent Publication No. 58-4112.

While the wide angle lens system has an angle of view of 56 degrees and an F number of approximately 2.0 and is well corrected for various aberrations, nevertheless, various constraints must be imposed upon the overall camera size. For example, since the wide angle lens system is intended to be used with single lens reflex cameras and consequently, has a long back focal distance, it must have a long overall length (which is a distance from the foremost surface of the lens system to a focal point) which is undesirable for miniaturized or compact cameras. Together, the angle of view of approximately 56 degrees is somewhat narrow for lens shutter cameras.

Another wide angle lens system, described in, for instance, Japanese Unexamined Patent Publication No.5-164961, has a wide angle of view of 63 degrees and an F number of 2.0. This wide angle lens is designed for use with lens shutter cameras so as to have a sufficient space for installation of a lens shutter and well corrected for sagittal come which is generally caused by surfaces on opposite sides of the lens shutter.

This wide angle lens system has an overall length approximately 1.4 times as long as its focal length, rendering a camera difficult to be made compact. Further, though the wide angle lens system is well corrected for sagittal coma, it still has large aberrations, such as astigmatism and distortion, and consequently is not said to be well collected for aberrations as a whole.

SUMMARY OF THE INVENTION

It is an object of the present invention to provide a wide angle photographic lens system which is well corrected for various aberrations over narrow to wide field coverage and excellent performance capabilities over various object distances.

It is another object of the present invention to provide a wide angle photographic lens system having an overall length approximately 1.1 to 1.2 times as long as its focal length which provides a compact design of cameras and an angle of view of approximately 60 degrees and an F number between approximately 2.8 and 4.0 which provide a high lens speed.

The above object of the present invention is achieved by providing a photographic lens system comprises, in order from the object end, a first positive power element having a concave image end surface, a second element having a concave image end surface, a negative power element, a fourth positive power element, a fifth meniscus element of a positive power having a concave object end surface, and a doublet comprising a sixth negative power element having a concave object end surface and a seventh positive power element having a convex image end surface, and satisfies the following conditions:

$$0.28 < f/f4 < 2.55 \quad (1)$$

$$0 < f/f5 < 1.80 \quad (2)$$

$$-1.15 < f/f67 < 0.65 \quad (3)$$

$$-0.55 < (R6-R7)/(R6+R7) < -0.17 \quad (4)$$

$$0.03 < (R10-R11)/(R10+R11) < 0.31 \quad (5)$$

$$-0.45 < (R11-R14)/(R11+R14) < 0.10 \quad (6)$$

where f is the overall focal length of the photographic lens system;
 f4 is the focal length of the fourth element;
 f5 is the focal length of the fifth element;
 f67 is the overall focal length of the doublet;
 Rn is the radius of the n-th surface from the object end of the photographic lens system;

It is more desirable that the first and second elements are meniscus elements of positive powers, the third element is a meniscus element having a convex object end surface, and the fourth element is a meniscus element having a convex object end surface, and further satisfies the following conditions:

$$0.28 < f/f4 < 1.36 \quad (7)$$

$$-0.65 < (R6-R7)/(R6+R7) < -0.28 \quad (8)$$

The parameters set forth are necessary for suitably balancing the aberrations and significantly reducing aggravation of aberrations of the photographic lens system. Satisfaction of these parameters ensures a compact photographic lens system with a short overall length.

The first parameter ($0.28 < f/f4 < 2.55$) governs spherical aberration, coma and field curvature. Exceeding the upper extreme provides aggravation of spherical aberration and coma which can not be corrected even by restricting other conditions. On the other hand, exceeding the lower extreme provides aggravation of field curvature to an unacceptable extent The second parameter ($0 < f/f5 < 1.80$) governs spherical aberration and coma. If the extremes are exceeded, a reduction in aggravation of spherical aberration and coma occurs. Specifically, exceeding the upper extreme provides an excessive increase in spherical aberration which can not be corrected even by restricting other conditions. On the other hand, exceeding the lower extreme provides an excessive increase in both of field curvature and coma.

Each of the third parameter ($-1.15 < f/f67 < 0.65$) and the sixth parameter ($-0.45 < (R11-R14)/(R11+R14) < 0.10$) governs the overall length of the photographic lens system necessary for maintaining a compact lens design which remains well balanced in aberrations. If the upper extreme of either one of these parameters is exceeded, the photographic lens system has to have a long overall length, rendering a camera difficult to be made compact. On the other hand, if the lower extreme of either one of these parameters is exceeded, while the photographic lens system has a relatively short overall length, nevertheless, it is difficult to remain well balanced in aberrations and consequently, has no practical utilization.

The fourth parameter ($-0.55 < (R6-R7)/(R6+R7) < -0.17$) governs field curvature. If at least one of the upper and lower extremes is exceeded, the photographic lens system incurs aggravation of field curvature to an extent which can not be dissolved even by restricting other conditions.

The fifth parameter ($0.03 < (R10-R11)/(R10+R11) < 0.31$) governs spherical aberration and field curvature. If the upper extreme is exceeded, the photographic lens system incurs aggravation of both spherical aberration and field curvature to an extent which can not be dissolved even by restricting other conditions. On the other hand, if the lower extreme is exceeded, the photographic lens system incurs aggravation of both spherical aberration to an extent which is difficult to be dissolved.

Satisfaction of these conditions (1)–(6) provides a photographic lens system that has almost ideal correction for aberrations over narrow to wide field and that has a high resolving power and excellent performance capabilities over various object distances even when it has a high lens speed, such as defined by an F number of approximately 2.8 to 4.0 and an angle of view of approximately 60 degrees, and an overall length approximately 1.1 to 1.2 times as long as its focal length.

BRIEF DESCRIPTION OF THE DRAWINGS

The above and other objects and features of the present invention will be clearly understood from the following description with respect to a preferred embodiment thereof when considered in conjunction with the accompanying drawings, wherein same numerals have been used herein to denote the same or similar elements throughout the drawings, and in which.

DETAILED DESCRIPTION OF THE PREFERRED EMBODIMENTS

A photographic lens system embodying the present invention as exemplified in FIGS. 1–12, which has an F number between approximately 2.8 and 4.0, an angle of view ($2\Psi$) between approximately 59 and 60 degrees, and an overall length (L) approximately 1.1 to 1.2 times as long as its focal length (f), comprises, in order from the object end, a first positive power element having a concave image end surface, a second element having a concave image end surface, a negative power element, a fourth positive power element, a fifth meniscus element of a positive power having a concave object end surface, and a doublet comprising a sixth negative power element having a concave object end surface and a seventh positive power element having a convex image end surface.

In the following prescription tables where various embodiments of the invention are set forth, the reference L followed by an arabic numeral indicates the lens element progressively from the object end to the image end of the photographic lens system. The reference radius numbers r are the progressive lens surface radii. Positive surface radii are struck from the right of the lens surface on the optical axis. Negative surface radii are struck from the left of the lens surface on the optical axis. The reference axial distance numbers r are the progressive axial distance between adjacent surfaces. N is the index of refraction of the lens element. $\upsilon$ is the dispersion of the lens element as defined by the Abbe number.

Figure 1:
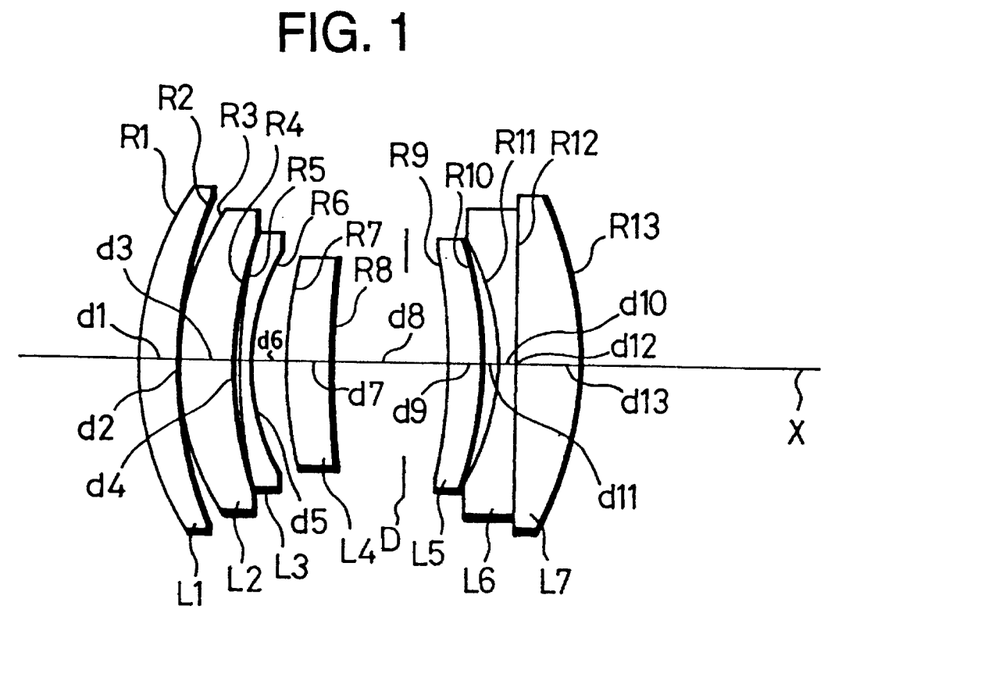
FIG. 1 is a diagrammatic side view of a photographic lens system according to a preferred embodiment of the present invention.

In the first embodiment of the present invention shown in FIG. 1, all of the lens elements consists of meniscus elements. Specifically, the photographic lens system in FIG. 1 comprises a positive power meniscus element L1 having a concave image end surface, a positive power meniscus element L2 having a concave image end surface, a negative power meniscus element L3, a positive power meniscus element L4, a positive power meniscus element L5 having a concave object end surface, and a negative power meniscus element L6 having a concave object end surface and a positive power meniscus element L7 having a convex image end surface, arranged on the optical axis X in this order from the object end. The elements L6 and L7 are cemented together so as to form a meniscus doublet. These lens elements are grouped into two, namely a front or first group G1 comprising the first four elements L1 and L4 and a rear or second group G2 comprising the remaining three elements L5 and L7. The photographic lens system has a diaphragm D fixedly disposed between the front and rear lens groups G1 and G2. In this instance, there is provided in the photographic lens system a relatively large axial distance between the front and rear lens groups G1 and G2 for installation of a so called between-the-lens shutter.

The photographic lens system as shown in FIG. 1 scaled to an image frame of 24×36 mm is substantially described in Table I.

TABLE I

| f = 100.00 | F = 4.00 | Angle of View $2\psi$ = 59.2° | L = 118.37 |

| Element | Radius of Curvature (mm) | Axial Distance Between Surfaces (mm) | N | $\upsilon$ |
| --- | --- | --- | --- | --- |
| $L_1$ | $R_1$ = 30.995 | | | |
| | | $d_1$ = 4.07 | 1.83400 | 37.34 |
| | $R_2$ = 42.282 | | | |
| | | $d_2$ = 0.16 | | |
| $L_2$ | $R_3$ = 29.914 | | | |
| | | $d_3$ = 4.85 | 1.78590 | 43.93 |
| | $R_4$ = 41.449 | | | |
| | | $d_4$ = 0.54 | | |
| | $R_5$ = 53.065 | | | |

TABLE I-continued f = 100.00   F = 4.00   Angle of View 2ψ = 59.2°   L = 118.37

| Element | Radius of Curvature (mm) | Axial Distance Between Surfaces (mm) | N | ν |
|---|---|---|---|---|
| $L_3$ | | $d_5 = 1.62$ | 1.80518 | 25.50 |
| | $R_6 = 22.314$ | | | |
| | | $d_6 = 3.31$ | | |
| | $R_7 = 54.181$ | | | |
| $L_4$ | | $d_7 = 4.46$ | 1.72342 | 37.99 |
| | $R_8 = 115.551$ | | | |
| | | $d_8 = 11.48$ | | |
| | $R_9 = -52.783$ | | | |
| $L_5$ | | $d_9 = 3.47$ | 1.83400 | 37.34 |
| | $R_{10} = -36.938$ | | | |
| | | $d_{10} = 1.60$ | | |
| | $R_{11} = -24.232$ | | | |
| $L_6$ | | $d_{11} = 1.70$ | 1.64769 | 33.90 |
| | $R_{12} = -453.111$ | | | |
| | | $d_{12} = 0$ | | |
| | $R_{13} = -453.111$ | | | |
| $L_7$ | | $d_{13} = 6.99$ | 1.78590 | 43.93 |
| | $R_{14} = -32.880$ | | | |

The parameters of the photographic lens system is as follows:

$f/f4 = 0.73$ (1)

$f/f5 = 0.75$ (2)

$f/f67 = 0.0029$ (3)

$(R6-R7)/(R6+R7) = -0.42$ (4)

$(R10-R11)/(R10+R11) = 0.21$ (5)

$(R11-R14)/(R11+R14) = -0.15$ (6)

As apparent from the above, the photographic lens system shown in FIG. 1 satisfies all of the conditions (1)–(6) and further the conditions (7) and (8).

Figure 2A:
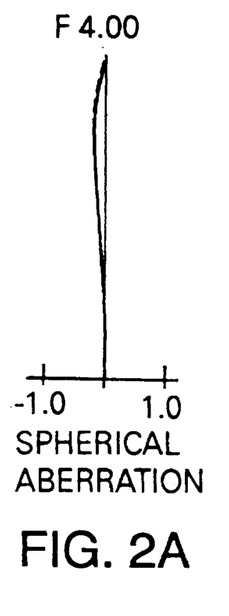
FIG. 2 shows diagrams of aberrations of the photographic lens system of FIG. 1.
Figure 2B:
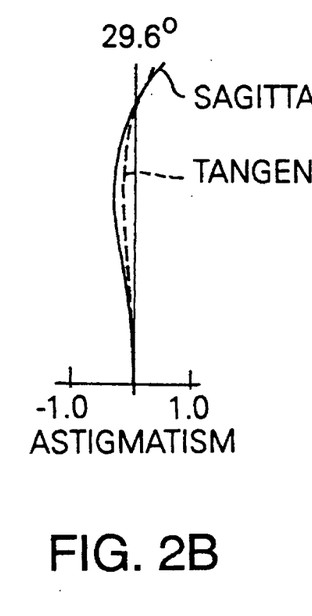
Figure 2C:
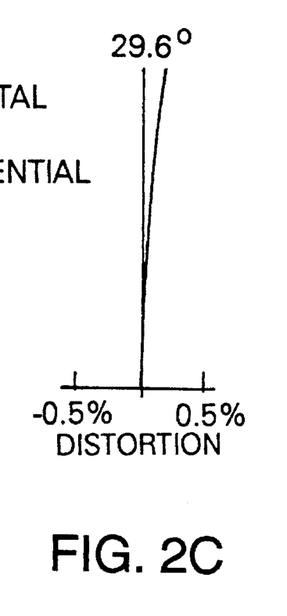

FIG. 2 shows diagrams illustrating aberrations, including spherical aberration, astigmatism and field curvature. As apparent in FIG. 2, the photographic lens system has superior correction for these aberrations.

The photographic lens system depicted in FIG. 1 and described in Table I, which satisfies all of the conditions (1)–(8) set forth, is compact even having an axial distance between the front and rear groups G1 and G2 sufficient for a lens-shutter unit. Together, it is well corrected for various aberrations and provides excellent performance capabilities.

Figure 3:
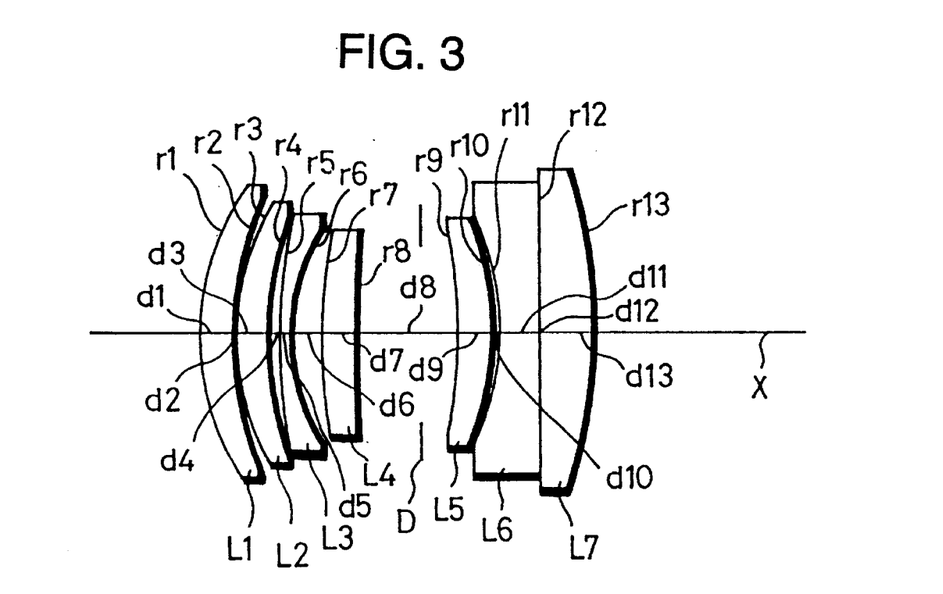
FIG. 3 is a diagrammatic side view of a photographic lens system according to another preferred embodiment of the present invention.

FIG. 3 shows a photographic lens system in accordance with another preferred embodiment of the present invention which is similar to that shown in FIG. 1 excepting that sixth and seventh elements L6 and L7 are not meniscus elements.

The photographic lens system as shown in FIG. 3 scaled to an image frame of 24×36 mm is substantially described in Table II.

TABLE II f = 100.00   F = 4.00   Angle of View 2ψ = 59.6°   L = 116.20

| Element | Radius of Curvature (mm) | Axial Distance Between Surfaces (mm) | N | ν |
|---|---|---|---|---|
| $L_1$ | $R_1 = 28.778$ | $d_1 = 3.67$ | 1.80500 | 47.50 |
| | $R_2 = 36.724$ | | | |
| | | $d_2 = 0.16$ | | |
| | $R_3 = 29.214$ | | | |
| $L_2$ | | $d_3 = 3.53$ | 1.80500 | 47.50 |
| | $R_4 = 39.889$ | | | |
| | | $d_4 = 0.94$ | | |
| | $R_5 = 66.674$ | | | |
| $L_3$ | | $d_5 = 1.64$ | 1.67378 | 31.87 |
| | $R_6 = 22.917$ | | | |
| | | $d_6 = 2.81$ | | |
| | $R_7 = 53.348$ | | | |
| $L_4$ | | $d_7 = 4.09$ | 1.80500 | 47.50 |
| | $R_8 = 150.231$ | | | |
| | | $d_8 = 10.85$ | | |
| | $R_9 = -53.837$ | | | |
| $L_5$ | | $d_9 = 4.84$ | 1.80500 | 47.50 |
| | $R_{10} = -26.648$ | | | |
| | | $d_{10} = 0.34$ | | |
| | $R_{11} = 24.167$ | | | |
| $L_6$ | | $d_{11} = 4.09$ | 1.65308 | 33.35 |
| | $R_{12} = 17746.117$ | | | |
| | | $d_{12} = 0$ | | |
| | $R_{13} = 17746.117$ | | | |
| $L_7$ | | $d_{13}\ 6.32$ | 1.80500 | 35.12 |
| | $R_{14} = -56.502$ | | | |

The parameters of the photographic lens system is as follows:

$f/f4 = 0.99$ (1)

$f/f5 = 1.65$ (2)

$f/f67 = -1.05$ (3)

$(R6-R7)(R6+R7) = -0.40$ (4)

$(R10-R11)/(R10+R11) = 0.049$ (5)

$(R11-R14)/(R11+R14) = -0.40$ (6)

As apparent from the above, the photographic lens system shown in FIG. 3 satisfies all of the conditions (1)–(6) and further the conditions (7) and (8).

Figure 4A:
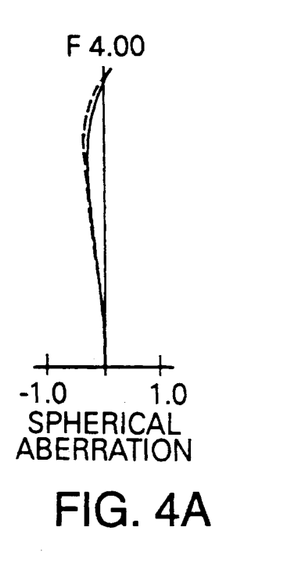
FIG. 4 shows diagrams of aberrations of the photographic lens system of FIG. 3.
Figure 4B:
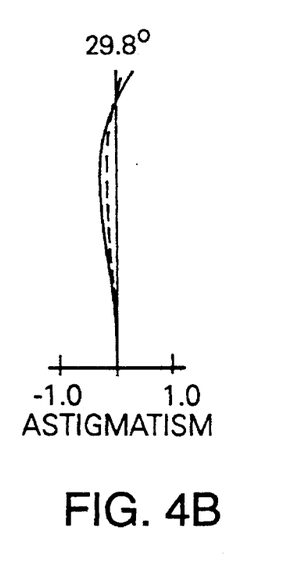
Figure 4C:
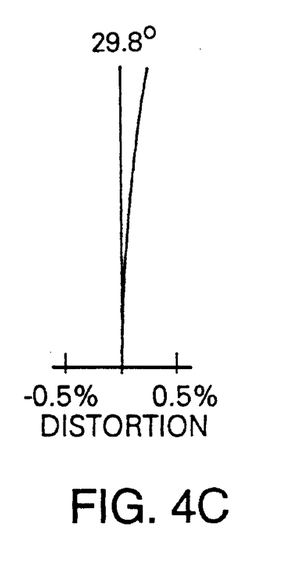

FIG. 4 shows diagrams illustrating aberrations, including spherical aberration, astigmatism and field curvature. As apparent in FIG. 4, the photographic lens system has superior correction for these aberrations.

Figure 5:
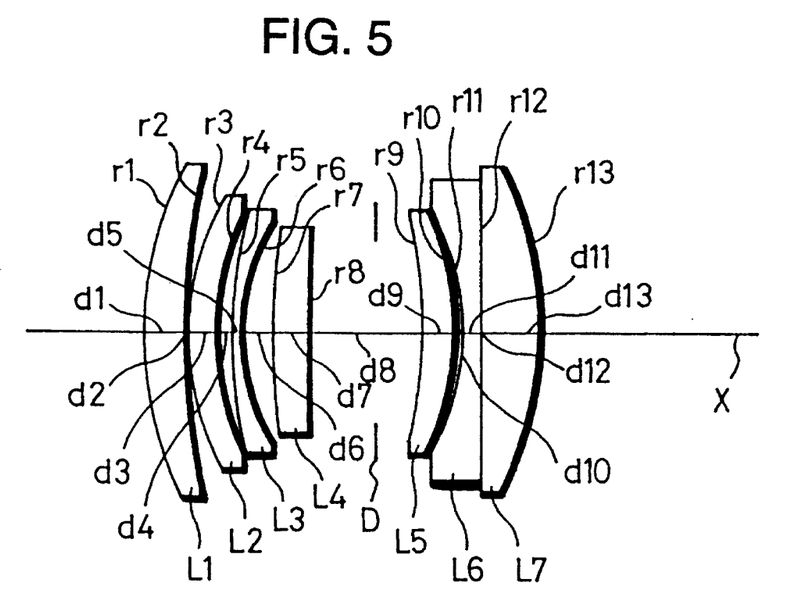
FIG. 5 is a diagrammatic side view of a photographic lens system according to still another preferred embodiment of the present invention.
Figure 6A:
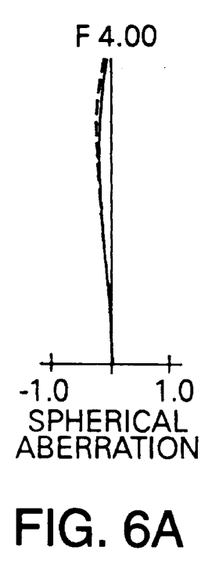
FIG. 6 shows diagrams of aberrations of the photographic lens system of FIG. 5.
Figure 6B:
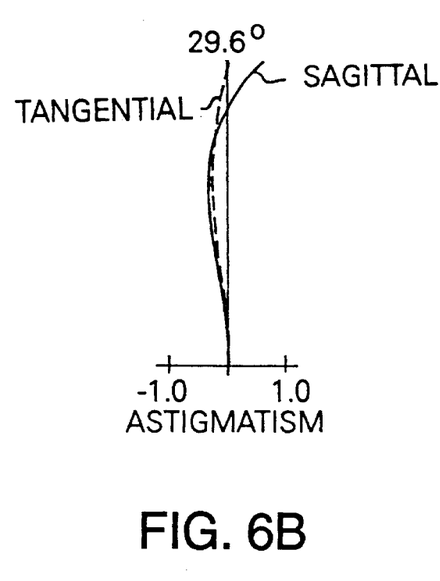
Figure 6C:
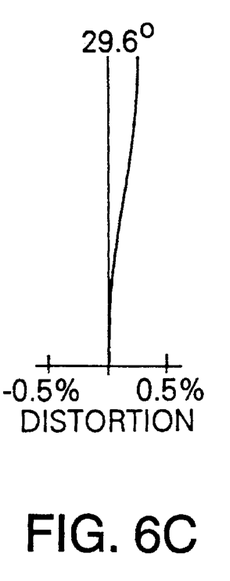
Figure 7:
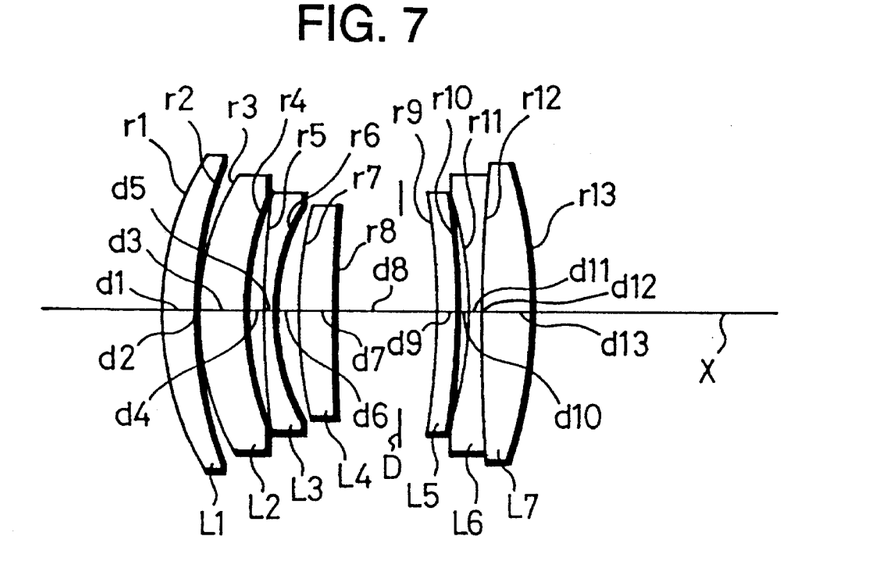
FIG. 7 is a diagrammatic side view of a photographic lens system according to another preferred embodiment of the present invention.
Figures 8A, 8B, 8C:
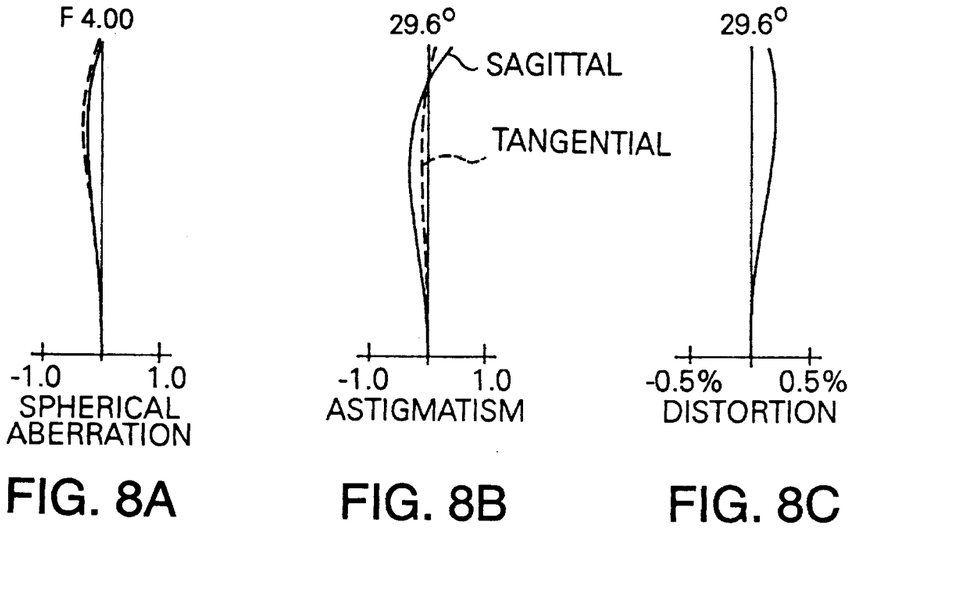
FIG. 8 shows diagrams of aberrations of the photographic lens system of FIG. 7.
Figure 9:
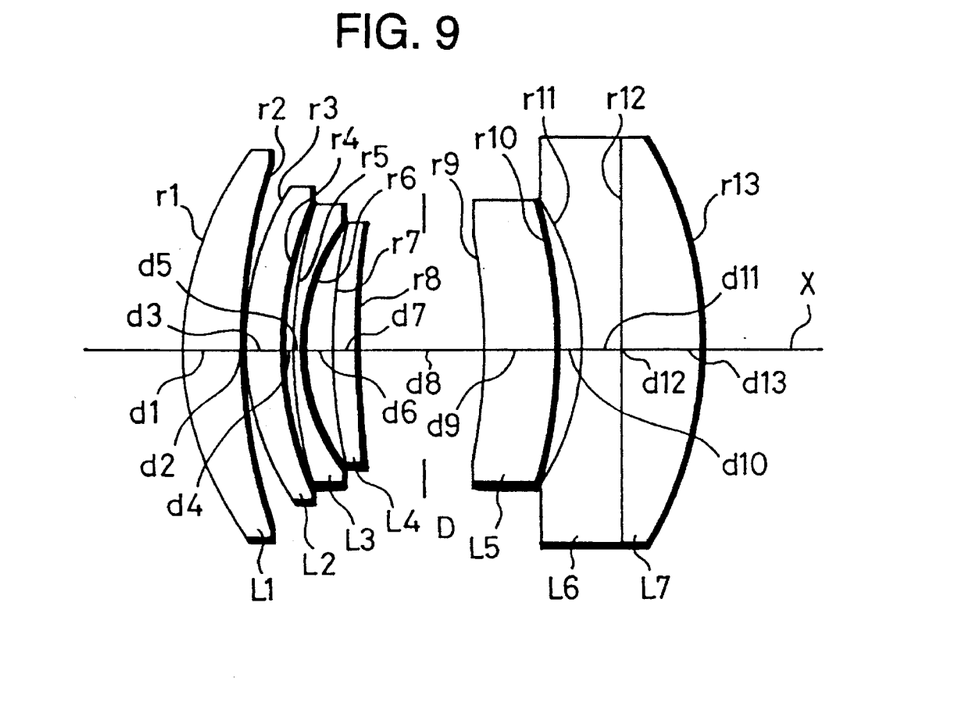
FIG. 9 is a diagrammatic side view of a photographic lens system according to a further preferred embodiment of the present invention.
Figure 10A:
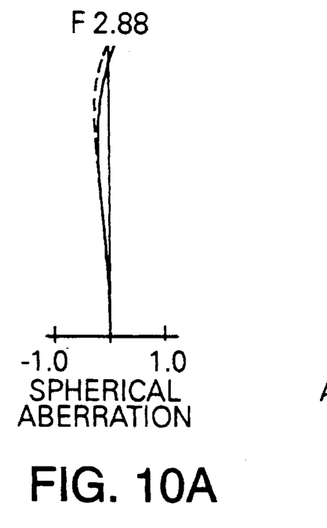
FIG. 10 shows diagrams of aberrations of the photographic lens system of FIG. 9.
Figure 10B:
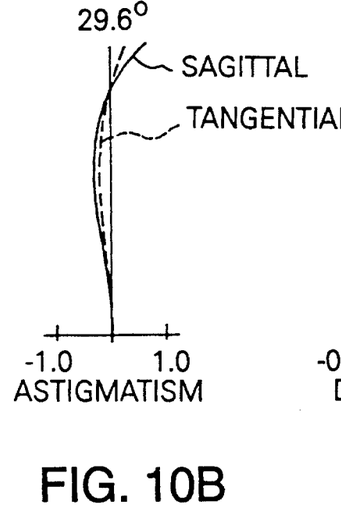
Figure 10C:
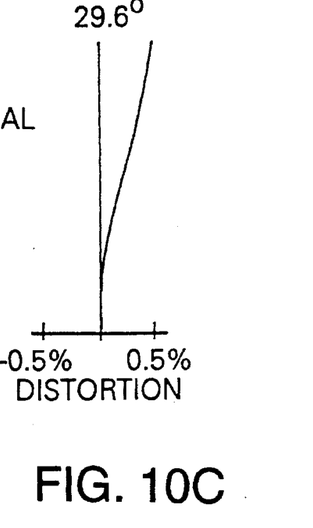

FIGS. 5, 7 and 9 show photographic lens systems in accordance with other preferred embodiments of the present invention which have components similar to those shown in FIG. 3. Aberrations, including spherical aberration, astigmatism and field curvature, of the photographic lens systems of FIGS. 5, 7 and 9 are shown in FIGS. 6, 8 and 10, respectively.

The photographic lens system as shown in FIG. 5 scaled to an image frame of 24×36 mm is substantially described in Table III.

| | f = 100.00 F = 4.00 Angle of View 2ψ = 59.2° L = 118.52 | | | |
|---|---|---|---|---|
| Element | Radius of Curvature (mm) | Axial Distance Between Surfaces (mm) | N | ν |
| $L_1$ | $R_1 = 34.628$ | $d_1 = 4.76$ | 1.80370 | 47.63 |
| | $R_2 = 71.658$ | $d_2 = 0.16$ | | |
| $L_2$ | $R_3 = 28.077$ | $d_3 = 3.24$ | 1.80500 | 47.50 |
| | $R_4 = 34.113$ | $d_4 = 1.10$ | | |
| $L_3$ | $R_5 = 56.358$ | $d_5 = 1.62$ | 1.69296 | 30.50 |
| | $R_6 = 22.035$ | $d_6 = 2.71$ | | |
| $L_4$ | $R_7 = 85.077$ | $d_7 = 4.05$ | 1.49000 | 65.38 |
| | $R_8 = 195.251$ | $d_8 = 11.49$ | | |
| $L_5$ | $R_9 = 49.071$ | $d_9 = 3.46$ | 1.68331 | 57.33 |
| | $R_{10} = -34.929$ | $d_{10} = 0.78$ | | |
| $L_6$ | $R_{11} = -25.236$ | $d_{11} = 1.70$ | 1.57961 | 40.07 |
| | $R_{12} = 4496.153$ | $d_{12} = 0$ | | |
| $L_7$ | $R_{13} = -4496.153$ | $d_{13} = 7.31$ | 1.74609 | 48.34 |
| | $R_{14} = -34.457$ | | | |

The parameters of the photographic lens system is as follows:

f/f4=0.33 (1)

f/f5=0.62 (2)

f/f67=0.17 (3)

(R6–R7)/(R6+R7)=–0.59 (4)

(R10–R11)/(R10+R11)=0.16 (5)

(R11–R14)/(R11+R14)=–0.15 (6)

The photographic lens system as shown in FIG. 7 scaled to an image frame of 24×36 mm is substantially described in Table IV.

TABLE IV

| | f = 100.00 F = 4.00 Angle of View 2ψ = 59.2° L = 113.69 | | | |
|---|---|---|---|---|
| Element | Radius of Curvature (mm) | Axial Distance Between Surfaces (mm) | N | ν |
| $L_1$ | $R_1 = 32.606$ | $d_1 = 3.63$ | 1.80499 | 47.54 |
| | $R_2 = 44.872$ | $d_2 = 0.06$ | | |
| $L_2$ | $R_3 = 28.543$ | $d_3 = 4.84$ | 1.80499 | 47.54 |
| | $R_4 = 32.756$ | $d_4 = 1.53$ | | |
| $L_3$ | $R_5 = 84.203$ | $d_5 = 1.62$ | 1.69180 | 30.59 |
| | $R_6 = 23.258$ | $d_6 = 1.98$ | | |
| $L_4$ | $R_7 = 45.600$ | $d_7 = 4.05$ | 1.80500 | 47.47 |
| | $R_8 = 143.790$ | | | |

TABLE IV-continued

| | f = 100.00 F = 4.00 Angle of View 2ψ = 59.2° L = 113.69 | | | |
|---|---|---|---|---|
| Element | Radius of Curvature (mm) | Axial Distance Between Surfaces (mm) | N | ν |
| | | $d_8 = 10.39$ | | |
| $L_5$ | $R_9 = -80.291$ | $d_9 = 2.59$ | 1.80502 | 47.50 |
| | $R_{10} = -79.457$ | $d_{10} = 0.70$ | | |
| $L_6$ | $R_{11} = -46.565$ | $d_{11} = 1.70$ | 1.59954 | 38.04 |
| | $R_{12} = 207.691$ | $d_{12} = 0$ | | |
| $L_7$ | $R_{13} = -207.691$ | $d_{13} = 5.58$ | 1.80508 | 47.50 |
| | $R_{14} = 47.623$ | | | |

The parameters of the photographic lens system is as follows:

f/f4=1.23 (1)

f/f5=0.03 (2)

f/f67=0.59 (3)

(R6–R7)/(R6+R7)=–0.32 (4)

(R10–R11)/(R10+R11)=0.26 (5)

(R11–R14)/(R11+R14)=–0.01 (6)

The photographic lens system as shown in FIG. 9 scaled to an image frame of 24×36 mm is substantially described in Table V.

TABLE V

| | f = 100.00 F = 2.88 Angle of View 2ψ = 59.2° L = 120.77 | | | |
|---|---|---|---|---|
| Element | Radius of Curvature (mm) | Axial Distance Between Surfaces (mm) | N | ν |
| $L_1$ | $R_1 = 33.113$ | $d_1 = 6.80$ | 1.78590 | 44.19 |
| | $R_2 = 60.003$ | $d_2 = 0.24$ | | |
| $L_2$ | $R_3 = 30.331$ | $d_3 = 4.56$ | 1.79952 | 42.24 |
| | $R_4 = 37.438$ | $d_4 = 0.81$ | | |
| $L_3$ | $R_5 = 50.937$ | $d_5 = 1.62$ | 1.80518 | 25.43 |
| | $R_6 = 22.221$ | $d_6 = 2.85$ | | |
| $L_4$ | $R_7 = 59.388$ | $d_7 = 3.12$ | 1.83400 | 37.17 |
| | $R_8 = 105.516$ | $d_8 = 13.35$ | | |
| $L_5$ | $R_9 = -90.463$ | $d_9 = 8.60$ | 1.83400 | 37.17 |
| | $R_{10} = -51.233$ | $d_{10} = 2.09$ | | |
| $L_6$ | $R_{11} = -28.663$ | $d_{11} = 4.41$ | 1.71736 | 29.51 |
| | $R_{12} = 1164.400$ | $d_{12} = 0$ | | |
| $L_7$ | $R_{13} = -1164.400$ | $d_{13} = 9.73$ | 1.83400 | 37.17 |
| | $R_{14} = -40.562$ | | | |

The parameters of the photographic lens system is as follows:

$$f/f4 = 0.63 \quad (1)$$

$$f/f5 = 0.78 \quad (2)$$

$$f/f67 = 0.032 \quad (3)$$

$$(R6-R7)/(R6+R7) = -0.46 \quad (4)$$

$$(R10-R11)/(R10+R11) = 0.28 \quad (5)$$

$$(R11-R14)/(R11+R14) = -0.17 \quad (6)$$

As apparent from the above, the photographic lens systems shown in FIGS. 5, 7 and 9 satisfy all of the conditions (1)–(6) and further the conditions (7) and (8) and has excellent correction for aberrations.

Figure 11:
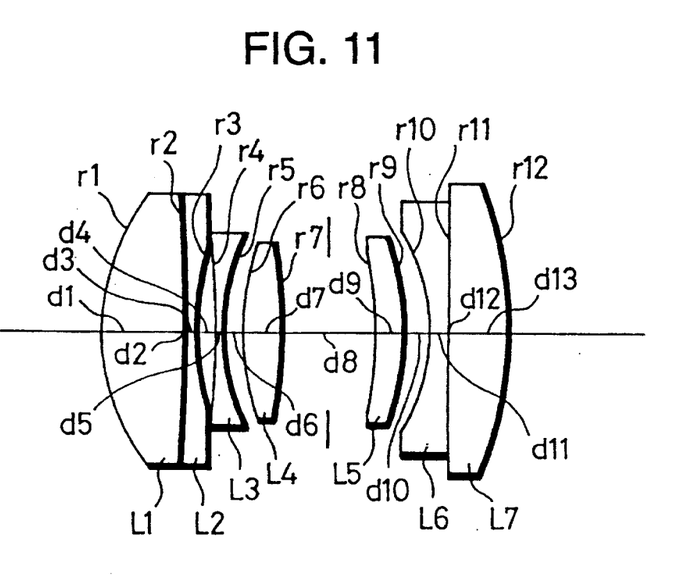
FIG. 11 is a diagrammatic side view of a photographic lens system according to a still further preferred embodiment of the present invention.

FIG. 11 shows still another embodiment of the present invention. The photographic lens system shown in FIG. 11 comprises, in order from the object end, a bi-convex element L1, a bi-concave element L2, a bi-concave element L3, a bi-convex element L4, a positive power meniscus element L5 having a concave object end surface, a bi-concave element L6, and a bi-convex element L7. The elements L1 and L2 are cemented together so as to form a meniscus doublet of positive power. Further, the elements L6 and L7 are cemented together so as to form a meniscus doublet of negative power. These lens elements are grouped into two, namely a front or first group G1 comprising the first four elements L1 and L4 and a rear or second group G2 comprising the remaining three elements L5 and L7. The photographic lens system has a diaphragm D fixedly disposed between the front and rear lens groups G1 and G2 there is provided in the photographic lens system a relatively large axial distance between the front and rear lens groups G1 and G2 where a between-the-lens shutter unit is installed.

The photographic lens system as shown in FIG. 11 scaled to an image frame of 24×36 mm is substantially described in Table VI.

TABLE VI

| Element | Radius of Curvature (mm) | Axial Distance Between Surfaces (mm) | N | ν |
|---|---|---|---|---|
| | \multicolumn{4}{l}{f = 100.00  F = 4.00 Angle of View 2ψ = 68.8°  L = 109.63} | | | |
| L$_1$ | R$_1$ = 26.432 | | | |
| | | d$_1$ = 9.54 | 1.69680 | 55.60 |
| | R$_2$ = −461.081 | | | |
| | | d$_2$ = 0 | | |
| L$_2$ | R$_3$ = 461.081 | | | |
| | | d$_3$ = 1.18 | 1.69895 | 30.00 |
| | R$_4$ = 41.706 | | | |
| | | d$_4$ = 2.29 | | |
| L$_3$ | R$_5$ = −99.692 | | | |
| | | d$_5$ = 1.24 | 1.54072 | 47.20 |
| | R$_6$ = 27.255 | | | |
| | | d$_6$ = 2.07 | | |
| L$_4$ | R$_7$ = 41.291 | | | |
| | | d$_7$ = 4.51 | 1.62606 | 39.10 |
| | R$_8$ = −74.939 | | | |
| | | d$_8$ = 10.80 | | |
| L$_5$ | R$_9$ = −58.038 | | | |
| | | d$_9$ = 3.87 | 1.62280 | 56.90 |
| | R$_{10}$ = −31.378 | | | |
| | | d$_{10}$ = 2.46 | | |
| L$_6$ | R$_{11}$ = 22.676 | | | |
| | | d$_{11}$ = 1.96 | 1.58144 | 40.80 |
| | R$_{12}$ = 1580.834 | | | |
| | | d$_{12}$ = 0 | | |
| | R$_{13}$ = −1580.834 | | | |

TABLE VI-continued

| Element | Radius of Curvature (mm) | Axial Distance Between Surfaces (mm) | N | ν |
|---|---|---|---|---|
| | \multicolumn{4}{l}{f = 100.00  F = 4.00 Angle of View 2ψ = 68.8°  L = 109.63} | | | |
| L$_7$ | | d$_{13}$ = 7.47 | 1.67003 | 47.20 |
| | R$_{14}$ = −47.220 | | | |

The parameters of the photographic lens system is as follows:

$$f/f4 = 2.32 \quad (1)$$

$$f/f5 = 0.96 \quad (2)$$

$$f/f67 = -0.93 \quad (3)$$

$$(R6-R7)/(R6+R7) = -0.20 \quad (4)$$

$$(R10-R11)/(R10+R11) = 0.16 \quad (5)$$

$$(R11-R14)/(R11+R14) = -0.35 \quad (6)$$

As apparent from the above, the photographic lens system shown in FIG. 11 satisfies all of the conditions (1)–(6).

Figures 12A, 12B:
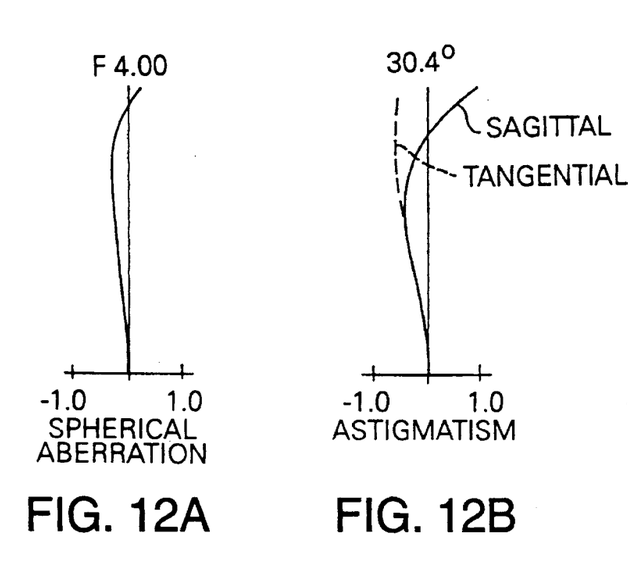
FIG. 12 shows diagrams of aberrations of the photographic lens system of FIG. 11.
Figure 12C:
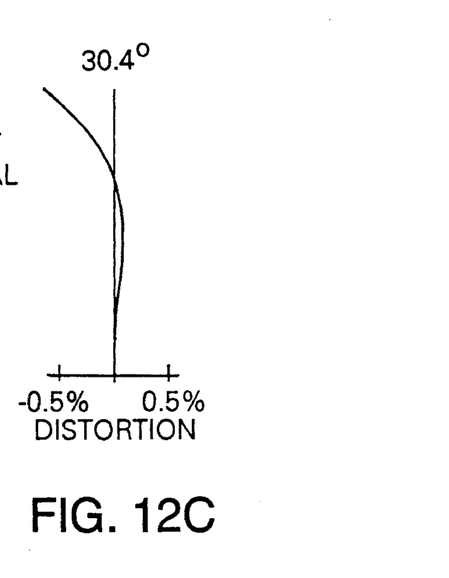

FIG. 12 shows diagrams illustrating aberrations, including spherical aberration, astigmatism and field curvature. As apparent in FIG. 2, the photographic lens system has superior correction for these aberrations.

As described above, the photographic lens system in accordance with the present invention has fine correction for various aberrations over narrow to wide field, providing a high resolving power and excellent performance capabilities over various object distances even having an overall length approximately 1.1 to 1.2 times as long as its focal length and a high lens speed such as having an angle of view of approximately 60 degrees and an F number between approximately 2.8 and 4.0. Particularly, the photographic lens system in accordance with the present invention is compact even having a sufficient space for installation of a lens-shutter unit, so that a compact camera with a between-the-lens shutter unit is realized by an utilization of the photographic lens.

It is to be understood that although the present invention has been described with regard to preferred embodiments thereof, various other embodiments and variants may occur to those skilled in the art, which are within the scope and spirit of the invention, and such other embodiments and variants are intended to be covered by the following claims.

What is claimed is:

1. A photographic lens system comprising, in order from an end of the lens system nearest an object to be photographed, a first positive power element having a concave image end surface, a second element having a concave image end surface, a negative power element, a fourth positive power element, a fifth meniscus element of a positive power having a concave object end surface, and a doublet comprising a sixth negative power element having a concave object end surface and a seventh positive power element having a convex image end surface, said photographic lens system satisfying the following conditions:

$$0.28 < f/f4 < 2.55 \quad (1)$$

$$0 < f/f5 < 1.80 \quad (2)$$

$$-1.15 < f/f67 < 0.065 \quad (3)$$

$-0.55 < (R6-R7)/(R6+R7) < -0.17$     (4)

$0.03 < (R10-R11)/(R10+R11) < 0.31$     (5)

$-0.45 < (R11-R14)/(R11+R14) < 0.10$     (6)

where f is the overall focal length of the photographic lens system;

f4 is the focal length of the fourth element;

f5 is the focal length of the fifth element;

f67 is the overall focal length of the doublet; and

Rn is the radius of the n-th surface from the left of the photographic lens system.

2. A photographic lens system as defined in claim 1, further satisfying the following conditions:

$0.28 < f/f4 < 1.36$;

$-0.65 < (R6-R7)/(R6+R7) < -0.28$.

3. A photographic lens system as defined in claim 1 substantially as described:

f = 100.00  F = 4.00  Angle of View 2ψ = 59.2°  L = 118.37

| Element | Radius of Curvature (mm) | Axial Distance Between Surfaces (mm) | N | ν |
|---|---|---|---|---|
| $L_1$ | $R_1 = 30.995$ | $d_1 = 4.07$ | 1.83400 | 37.34 |
|  | $R_2 = 42.282$ | $d_2 = 0.16$ |  |  |
| $L_2$ | $R_3 = 29.914$ | $d_3 = 4.85$ | 1.78590 | 43.93 |
|  | $R_4 = 41.449$ | $d_4 = 0.54$ |  |  |
| $L_3$ | $R_5 = 53.065$ | $d_5 = 1.62$ | 1.80518 | 25.50 |
|  | $R_6 = 22.314$ | $d_6 = 3.31$ |  |  |
| $L_4$ | $R_7 = 54.181$ | $d_7 = 4.46$ | 1.72342 | 37.99 |
|  | $R_8 = 115.551$ | $d_8 = 11.48$ |  |  |
| $L_5$ | $R_9 = -52.783$ | $d_9 = 3.47$ | 1.83400 | 37.34 |
|  | $R_{10} = -36.938$ | $d_{10} = 1.60$ |  |  |
| $L_6$ | $R_{11} = -24.232$ | $d_{11} = 1.70$ | 1.64769 | 33.90 |
|  | $R_{12} = -453.111$ | $d_{12} = 0$ |  |  |
| $L_7$ | $R_{13} = -453.111$ | $d_{13} = 6.99$ | 1.78590 | 43.93 |
|  | $R_{14} = -32.880$ |  |  |  | where the photographic lens system comprises elements L1 to L7 having surfaces $R_1$ to $R_{14}$, $d_1$ to $d_{13}$ are the axial distance between adjacent surfaces, the index of refraction is given by N, and the dispersion is defined by the Abbe number as given by υ.

4. A photographic lens system as defined in claim 1 substantially as described:

f = 100.00  F = 4.00  Angle of View 2ψ = 59.6°  L = 116.20

| Element | Radius of Curvature (mm) | Axial Distance Between Surfaces (mm) | N | ν |
|---|---|---|---|---|
| $L_1$ | $R_1 = 28.778$ | $d_1 = 3.67$ | 1.80500 | 47.50 |
|  | $R_2 = 36.724$ | $d_2 = 0.16$ |  |  |
| $L_2$ | $R_3 = 29.214$ | $d_3 = 3.53$ | 1.80500 | 47.50 |
|  | $R_4 = 39.889$ | $d_4 = 0.94$ |  |  |
| $L_3$ | $R_5 = 66.674$ | $d_5 = 1.64$ | 1.67378 | 31.87 |
|  | $R_6 = 22.917$ | $d_6 = 2.81$ |  |  |
| $L_4$ | $R_7 = 53.348$ | $d_7 = 4.09$ | 1.80500 | 47.50 |
|  | $R_8 = 150.231$ | $d_8 = 10.85$ |  |  |
| $L_5$ | $R_9 = -53.837$ | $d_9 = 4.84$ | 1.80500 | 47.50 |
|  | $R_{10} = -26.648$ | $d_{10} = 0.34$ |  |  |
| $L_6$ | $R_{11} = -24.167$ | $d_{11} = 4.09$ | 1.65308 | 33.35 |
|  | $R_{12} = 17746.117$ | $d_{12} = 0$ |  |  |
| $L_7$ | $R_{13} = 17746.117$ | $d_{13} = 6.32$ | 1.80500 | 35.12 |
|  | $R_{14} = -56.502$ |  |  |  | where the photographic lens system comprises elements L1 to L7 having surfaces $R_1$ to $R_{14}$, $d_1$ to $d_{13}$ are the axial distance between adjacent surfaces, the index of refraction is given by N, and the dispersion is defined by the Abbe number as given by υ.

5. A photographic lens system as defined in claim 1 substantially as described:

f = 100.00  F = 4.00  Angle of View 2ψ = 59.2°  L = 118.52

| Element | Radius of Curvature (mm) | Axial Distance Between Surfaces (mm) | N | ν |
|---|---|---|---|---|
| $L_1$ | $R_1 = 34.628$ | $d_1 = 4.76$ | 1.80370 | 47.63 |
|  | $R_2 = 71.658$ | $d_2 = 0.16$ |  |  |
| $L_2$ | $R_3 = 28.077$ | $d_3 = 3.24$ | 1.80500 | 47.50 |
|  | $R_4 = 34.113$ | $d_4 = 1.10$ |  |  |
| $L_3$ | $R_5 = 56.358$ | $d_5 = 1.62$ | 1.69296 | 30.50 |
|  | $R_6 = 22.035$ | $d_6 = 2.71$ |  |  |
| $L_4$ | $R_7 = 85.077$ | $d_7 = 4.05$ | 1.49000 | 65.38 |
|  | $R_8 = 195.251$ | $d_8 = 11.49$ |  |  |
| L5 | $R_9 = -49.071$ | $d_9 = 3.46$ | 1.68331 | 57.33 |
|  | $R_{10} = -34.929$ | $d_{10} = 0.78$ |  |  |
| $L_6$ | $R_{11} = -25.236$ | $d_{11} = 1.70$ | 1.57961 | 40.07 |
|  | $R_{12} = 4496.153$ | $d_{12} = 0$ |  |  |
| $L_7$ | $R_{13} = 4496.153$ | $d_{13} = 7.31$ | 1.74609 | 48.34 |

-continued f = 100.00   F = 4.00   Angle of View 2ψ = 59.2°   L = 118.52

| Element | Radius of Curvature (mm) | Axial Distance Between Surfaces (mm) | N | ν |
|---|---|---|---|---|
| | $R_{14}$ = −34.457 | | | | where the photographic lens system comprises elements L1 to L7 having surfaces $R_1$ to $R_{14}$, $d_1$ to $d_{13}$ are the axial distance between adjacent surfaces, the index of refraction is given by N, and the dispersion is defined by the Abbe number as given by ν.

6. A photographic lens system as defined in claim 1 substantially as described:

f = 100.00   F = 4.00   Angle of View 2ψ = 59.2°   L = 113.69

| Element | Radius of Curvature (mm) | Axial Distance Between Surfaces (mm) | N | ν |
|---|---|---|---|---|
| $L_1$ | $R_1$ = 32.606 | $d_1$ = 3.63 | 1.80499 | 47.54 |
| | $R_2$ = 44.872 | $d_2$ = 0.06 | | |
| $L_2$ | $R_3$ = 28.543 | $d_3$ = 4.84 | 1.80499 | 47.54 |
| | $R_4$ = 32.756 | $d_4$ = 1.53 | | |
| $L_3$ | $R_5$ = 84.203 | $d_5$ = 1.62 | 1.69180 | 30.59 |
| | $R_6$ = 23.258 | $d_6$ = 1.98 | | |
| $L_4$ | $R_7$ = 45.600 | $d_7$ = 4.05 | 1.80500 | 47.47 |
| | $R_8$ = 143.790 | $d_8$ = 10.39 | | |
| $L_5$ | $R_9$ = −80.291 | $d_9$ = 2.59 | 1.80502 | 47.50 |
| | $R_{10}$ = −79.457 | $d_{10}$ = 0.70 | | |
| $L_6$ | $R_{11}$ = −46.565 | $d_{11}$ = 1.70 | 1.59954 | 38.04 |
| | $R_{12}$ = 207.691 | $d_{12}$ = 0 | | |
| $L_7$ | $R_{13}$ = 207.691 | $d_{13}$ = 5.58 | 1.80508 | 47.50 |
| | $R_{14}$ = −47.623 | | | | where the photographic lens system comprises elements L1 to L7 having surfaces $R_1$ to $R_{14}$, $d_1$ to $d_{13}$ are the axial distance between adjacent surfaces, the index of refraction is given by N, and the dispersion is defined by the Abbe number as given by ν.

7. A photographic lens system as defined in claim 1 substantially as described:

f = 100.00   F = 2.88   Angle of View 2ψ = 59.2°   L = 120.77

| Element | Radius of Curvature (mm) | Axial Distance Between Surfaces (mm) | N | ν |
|---|---|---|---|---|
| $L_1$ | $R_1$ = 33.113 | $d_1$ = 6.80 | 1.78590 | 44.19 |
| | $R_2$ = 60.003 | $d_2$ = 0.24 | | |
| $L_2$ | $R_3$ = 30.331 | $d_3$ = 4.56 | 1.79952 | 42.24 |
| | $R_4$ = 37.438 | $d_4$ = 0.81 | | |
| | $R_5$ = 50.937 | | | |
| $L_3$ | $R_6$ = 22.221 | $d_5$ = 1.62 | 1.80518 | 25.43 |
| | $R_7$ = 59.388 | $d_6$ = 2.85 | | |
| $L_4$ | $R_8$ = 105.516 | $d_7$ = 3.12 | 1.83400 | 37.17 |
| | $R_9$ = 90.463 | $d_8$ = 13.35 | | |
| $L_5$ | $R_{10}$ = 51.233 | $d_9$ = 8.60 | 1.83400 | 37.17 |
| | $R_{11}$ = 28.663 | $d_{10}$ = 2.09 | | |
| $L_6$ | $R_{12}$ = 1164.400 | $d_{11}$ = 4.41 | 1.71736 | 29.51 |
| | $R_{13}$ = 1164.400 | $d_{12}$ = 0 | | |
| $L_7$ | $R_{14}$ = −40.562 | $d_{13}$ = 9.73 | 1.83400 | 37.17 | where the photographic lens system comprises elements L1 to L7 having surfaces $R_1$ to $R_{14}$, $d_1$ to $d_{13}$ are the axial distance between adjacent surfaces, the index of refraction is given by N, and the dispersion is defined by the Abbe number as given by ν.

8. A photographic lens system as defined in claim 1 substantially as described:

f = 100.00   F = 4.00   Angle of View 2ψ = 68.8°   L = 109.63

| Element | Radius of Curvature (mm) | Axial Distance Between Surfaces (mm) | N | ν |
|---|---|---|---|---|
| $L_1$ | $R_1$ = 26.432 | $d_1$ = 9.54 | 1.69680 | 55.60 |
| | $R_2$ = −461.081 | $d_2$ = 0 | | |
| $L_2$ | $R_3$ = −461.081 | $d_3$ = 1.18 | 1.69895 | 30.00 |
| | $R_4$ = 41.706 | $d_4$ = 2.29 | | |
| $L_3$ | $R_5$ = −99.692 | $d_5$ = 1.24 | 1.54072 | 47.20 |
| | $R_6$ = 27.255 | $d_6$ = 2.07 | | |
| $L_4$ | $R_7$ = 41.291 | $d_7$ = 4.51 | 1.62606 | 39.10 |
| | $R_8$ = −74.939 | $d_8$ = 10.80 | | |
| $L_5$ | $R_9$ = −58.038 | $d_9$ = 3.87 | 1.62280 | 56.90 |
| | $R_{10}$ = −31.378 | $d_{10}$ = 2.46 | | |
| $L_6$ | $R_{11}$ = −22.676 | $d_{11}$ = 1.96 | 1.58144 | 40.80 |
| | $R_{12}$ = 1580.834 | $d_{12}$ = 0 | | |
| $L_7$ | $R_{13}$ = 1580.834 | $d_{13}$ = 7.47 | 1.67003 | 47.20 |
| | $R_{14}$ = −47.220 | | | | where the photographic lens system comprises elements L1 to L7 having surfaces $R_1$ to $R_{14}$, $d_1$ to $d_{13}$ are the axial distance between adjacent surfaces, the index of refraction is given by N, and the dispersion is defined by the Abbe number as given by ν.

\* \* \* \* \*